United States Patent
Knapp et al.

(10) Patent No.: US 10,607,261 B2
(45) Date of Patent: Mar. 31, 2020

(54) UPFRONT ADVERTISEMENT PURCHASING EXCHANGE

(71) Applicant: VIANT TECHNOLOGY LLC, New York, NY (US)

(72) Inventors: Jason J. A. Knapp, Solana Beach, CA (US); Timothy Charles Vanderhook, Newport Beach, CA (US)

(73) Assignee: VIANT TECHNOLOGY LLC, New York, NY (US)

( * ) Notice: Subject to any disclaimer, the term of this patent is extended or adjusted under 35 U.S.C. 154(b) by 482 days.

(21) Appl. No.: 14/474,962

(22) Filed: Sep. 2, 2014

(65) Prior Publication Data

US 2015/0066662 A1    Mar. 5, 2015

Related U.S. Application Data

(60) Provisional application No. 61/873,319, filed on Sep. 3, 2013.

(51) Int. Cl.
| | |
|---|---|
| G06Q 30/00 | (2012.01) |
| G06Q 30/02 | (2012.01) |
| H04N 21/414 | (2011.01) |
| G06T 1/00 | (2006.01) |

(52) U.S. Cl.
CPC ......... *G06Q 30/0275* (2013.01); *G06Q 30/02* (2013.01); *G06Q 30/0249* (2013.01); *G06Q 30/0254* (2013.01); *G06Q 30/0269* (2013.01); *G06Q 30/0277* (2013.01); *G06T 1/0064* (2013.01); *H04N 21/41415* (2013.01)

(58) Field of Classification Search
CPC ........... G06Q 30/0275; G06Q 30/0254; G06Q 30/0249

USPC ........................................................... 705/14
See application file for complete search history.

(56) References Cited

U.S. PATENT DOCUMENTS

| | | | | |
|---|---|---|---|---|
| 8,973,023 | B1 * | 3/2015 | Rao | H04N 21/44222 |
| | | | | 705/14.44 |
| 10,108,971 | B2 * | 10/2018 | Rabbitt | G06Q 30/02 |
| 2003/0055723 | A1 | 3/2003 | English | |
| 2003/0074252 | A1 * | 4/2003 | Chandler-Pepelnjak | ..................... |
| | | | | G06Q 30/02 |
| | | | | 705/14.53 |

(Continued)

OTHER PUBLICATIONS

Chatwin; An Overview of Computational Challanges in Online Advertising; Jun. 17-19, 2013; American Control Conference; p. 5990-6007; pblication date Jun. 17-19, 2013.*

(Continued)

*Primary Examiner* — Radu Andrei
(74) *Attorney, Agent, or Firm* — Gates & Cooper LLP

(57) ABSTRACT

A method, apparatus, system, and computer program product provide the ability to bid for an advertising impression. Via input from an advertising purchaser, a publisher specification is defined. The publisher specification provides impression information regarding impressions desired by the advertising purchaser. An auction is conducted by receiving one or more bids (that comply with the specification) from one or more publishers. A determination is made regarding which of the one or more publishers has provided a successful bid. The advertising purchaser is enabled to provide one or more advertisements to the one or more successful bidding publishers.

16 Claims, 6 Drawing Sheets

(56) References Cited

U.S. PATENT DOCUMENTS

| | | | |
|---|---|---|---|
| 2004/0001605 A1* | 1/2004 | Venkatesan | G06T 1/0028 382/100 |
| 2008/0103837 A1 | 5/2008 | Flake et al. | |
| 2008/0103903 A1 | 5/2008 | Flake et al. | |
| 2009/0106087 A1* | 4/2009 | Konar | G06Q 30/02 705/14.71 |
| 2009/0125398 A1* | 5/2009 | Cochran | G06Q 30/02 705/14.69 |
| 2009/0177588 A1* | 7/2009 | Marchese | G06Q 30/02 705/80 |
| 2009/0293067 A1* | 11/2009 | Singh | G06Q 30/02 719/318 |
| 2009/0307081 A1* | 12/2009 | Rabbitt | G06Q 30/02 705/14.42 |
| 2010/0106613 A1* | 4/2010 | Bhatia | G06Q 30/02 705/26.1 |
| 2011/0246267 A1* | 10/2011 | Williams | G06Q 30/02 705/14.4 |
| 2011/0288940 A1* | 11/2011 | Horadan | F16K 31/0634 705/14.69 |
| 2012/0173342 A1* | 7/2012 | Rajaopadhye | G06Q 30/0272 705/14.68 |
| 2012/0209742 A1 | 8/2012 | Steigelfest | |
| 2013/0066725 A1* | 3/2013 | Umeda | G06Q 30/0275 705/14.66 |
| 2013/0066726 A1 | 3/2013 | Umeda | |
| 2013/0124331 A1* | 5/2013 | Doughty | G06Q 30/0269 705/14.66 |
| 2014/0019575 A1* | 1/2014 | Alexander, Jr. | G06F 16/9535 709/213 |
| 2014/0244406 A1* | 8/2014 | Garcia-Martinez | G06Q 30/0277 705/14.73 |
| 2015/0095166 A1* | 4/2015 | Sweeney | G06Q 30/08 705/14.71 |

OTHER PUBLICATIONS

Jacobik; Bidding Strategies Optimization for Online Video Ad Spot Market; Apr. 29, 2011; IEEE systems and Information; Engineering Design Symposium; p. 110-114; publication date Apr. 29, 2011.*
International Search Report and Written Opinion dated Dec. 4, 2014 for PCT App. No. PCT/US14/53742.
International Preliminary Report on Patentability dated Mar. 17, 2016 for PCT App. No. PCT/US14/53742.

* cited by examiner

UPFRONT ADVERTISEMENT PURCHASING EXCHANGE

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/873,319, filed on Sep. 3, 2013, by Jason J. A. Knapp and Timothy Charles Vanderhook, entitled "UPFRONT ADVERTISEMENT PURCHASING EXCHANGE."

This application is related to the following co-pending and commonly-assigned patent applications, which applications are incorporated by reference herein:

U.S. patent application Ser. No. 14/177,500, filed on Feb. 11, 2014 by Christophe L. Clapp and Brian C. DeFrancesco, entitled "COMPREHENSIVE MEASUREMENT OF THE OPPORTUNITY TO SEE ONLINE ADVERTISEMENTS", which application claims priority to U.S. Provisional Patent Application Ser. No. 61/763,226, filed on Feb. 11, 2013, by Christophe L. Clapp and Brian C. DeFrancesco, entitled "SYSTEM AND METHODOLOGY FOR COMPREHENSIVE MEASUREMENT OF THE OPPORTUNITY TO SEE ONLINE ADVERTISEMENTS ("VIEWABILITY")."

U.S. patent application Ser. No. 14/177,507, filed on Feb. 11, 2014 by Christophe L. Clapp and Brian C. DeFrancesco, entitled "SYSTEM AND METHOD TO ANALYZE AND RATE ONLINE ADVERTISEMENT PLACEMENT QUALITY AND POTENTIAL VALUE", which application claims priority to U.S. Provisional Patent Application Ser. No. 61/763,236, filed on Feb. 11, 2013, by Christophe L. Clapp and Brian C. DeFrancesco, entitled "SYSTEM AND METHODOLOGY TO ANALYZE AND RATE ONLINE ADVERTISEMENT PLACEMENT QUALITY AND POTENTIAL VALUE;" and U.S. patent application Ser. No. 14/474,947, filed on the Sep. 2, 2014, by Jason J. A. Knapp, Varoujan Bedirian, and Sergey Kuznetsov, entitled "BIDDING FOR ADVERTISING IMPRESSION IN AN ONLINE EXCHANGE USING ONE OR MORE MULTIPLE QUALITY MEASUREMENTS", which application claims priority to U.S. Provisional Patent Application Ser. No. 61/873,311, filed on Sep. 3, 2013, by Jason J. A. Knapp, Varoujan Bedirian, and Sergey Kuznetsov, entitled "BIDDING FOR ADVERTISING IMPRESSION IN AN ONLINE EXCHANGE USING ONE OR MORE MULTIPLE QUALITY MEASUREMENTS."

BACKGROUND OF THE INVENTION

1. Field of the Invention

The present invention relates generally to electronic/online advertisements, and in particular, to a method, apparatus, system, computer program product, and article of manufacture for conducting an auction/exchange for online advertisements based on an advertisement purchaser's specifications.

2. Description of the Related Art

Advertisers try to reach consumers using a variety of delivery mechanisms including via web-based advertising on the Internet and commercial broadcast advertising. Advertisements may be presented to potential consumers on a variety of presentation devices including televisions and/or portable devices [e.g., cellular devices, personal digital assistants, tablet computers, etc.]. In this regard and as used herein, an advertising impression is an individual instance when an advertisement (ad) is shown to a particular user. For example, when a user selects a web page to view, that instance of the web page may provide one or more opportunities for an ad impression (also referred to as an "impression"). If the user selects to view another web page, the other web page may provide one or more additional opportunities for an ad impression, i.e., another instance when an ad can be presented to the user.

Prior art mechanisms for advertisers to purchase an impression often utilize an online exchange where advertisers submit bids for one or more impressions (e.g., an auction for the impressions). Traditionally, bidding in an online exchange is done by: identifying the target audience (collective profile of portrayed users)(e.g., using demographic information); selecting the sites and parameters of the advertising campaign; and selecting a maximum bid for the ad exchange auction. Such a system merely provides a minimal amount of detail regarding the ad impression(s) the advertiser is bidding on. Further, such a system fails to provide the advertiser with the capability to negotiate an optimal advertisement campaign with multiple publishers (i.e., entities that have advertisement impressions for sale).

To better understand the problems of the prior art, a description of prior art advertisement technology may be useful.

Over the past few years, there has been a tremendous increase in ad inventory and demand (including video, display, and other ads across desktop, mobile, smart televisions, etc.). To better capitalize on the explosion of growth, some advertising markets have shifted into programmatic buying. Such a shift has lead to the commoditization of ad inventory, resulting in lower-quality executions being undifferentiated from higher-quality placements, ultimately leading to a diminished value that brands derive from their advertising.

To overcome such problems, the assignee of the present invention has created and provided an independent marketplace solution where both advertisers and publishers can transact through a trusted, independent third-party partner. Such a solution overcomes problems relating to ad inventory that has been overly commoditized due to a combination of very high demand and a lack of standards around quality. Such a solution also assesses the quality of inventory en masse and presents such an assessment to a marketplace for advertisers to buy at scale.

Using the solution offered by the assignee of the present invention (or others), two primary methods/models are often utilized to acquire impressions. In a first model, a fixed price is paid for a guaranteed number of advertising impressions. For example, an advertiser may pay $15 and receive a defined number of impressions. Some systems only allow a certain preferred set of companies to purchase advertisement impressions under this model (e.g., an advertising/media purchasing entity).

The second model for purchasing advertising is referred to as a second price auction or real time selling. In such a model, an entity programmatically buys advertisement space (e.g., via a guaranteed price model) and attempts to sell individual/sets of impressions on the secondary market via an auction/bidding system. In such a model, for every impression that arrives, a request for a bid for that advertisement is issued to one or more interested parties (e.g., a media purchasing entity, an advertisement firm, individuals, etc.). Such a bid request may provide information about the impression (e.g., the website, possible demographic information, etc.) and requests a bid. In response, bids are received and the highest bidder is awarded the impression. In a second price auction, the name of the actual advertiser (and not the middleman that is attempting to purchase the advertisement impression) may be provided/required in a submitted bid. In other words, the programmatic buyer may submit bids on behalf of individual advertisers for advertisement space. Alternatively, the programmatic buyer may sell the (already purchased) advertisement space to individual advertisers via a bidding process maintained by the programmatic buyer.

In the television industry, advertisement sales may be negotiated in what is referred to as an "upfront". In this regard, periodically, advertisement agencies meet with advertisement networks and negotiate a deal (e.g., an agreement to spend x dollars on a network over a defined time period (e.g., six [6] months or a year). Such an upfront is difficult in the online world due to the unpredictability and details associated with online advertising. Accordingly, prior art methods have failed to provide any upfront capability or have failed to gain acceptance due to a failure to address this unpredictability with respect to online advertising.

To better understand the background and advertising industry, a brief history of Internet based advertising may be useful. FIG. 1 illustrates an advertising ecosystem of the prior art. In early ecosystems, an advertiser (or agency of the advertiser) 102 directly bought ad space (referred to as ad inventory) on a website of a website owner/publisher 104. The inventory of ads was often in the form of ad impressions (as defined above). Over time, as the number of websites increased, ad space on the websites 104 exceeded the purchased ads leaving a large number of unpurchased inventory. Consequently, ad networks 106 evolved and acted as a sales broker, purchasing the ad inventory and selling packaged inventory to the buyer 102 thereby making it easier for the buyer 102 to target specific consumers. Multiple ad networks 106 resulted with each network 106 using different technology and systems. Advertisers 102 often utilized multiple ad networks 106 resulting in the targeting, presentation, and purchase of the same consumer/audience more than once.

Ad exchanges 108 evolved and provided the ability for advertisers to trade audiences instead of inventory. Sellers/publishers 104 offered their audience on the exchange 108, and purchasers 102 could purchase the audience (after which ads were delivered to the purchased audience). As a result, advertising could be purchased via both ad networks 106 and ad exchanges 108. To improve the sale and purchase of ads and increase efficiency, various agencies 102 created their own proprietary agency trading desks (ATD) 110 or demand side platforms (DSP) 112. ATD 110 and/or DSP 112 provided the ability for the agencies 102 to trade on the ad exchange 108 efficiently and in real time (using data to influence their decision making) Some publishers 104 sold directly on the exchange 108 while other publishers 104 invested in sell side platforms (SSP) 114 that optimized selling points for the publisher 104.

One of the side effects of the such an ecosystem is that publisher ad impressions ("inventory") is often commoditized with the inventory of millions of other websites without the inventory buyer 102 (advertiser or agency on their behalf) fully knowing where and how the inventory is sourced. Without placement transparency, the main differentiator of value is only "audience" (the user's interest and behaviors) targeting.

SUMMARY OF THE INVENTION

Embodiments of the invention overcome the problems of the prior art by providing an advertising exchange where advertising purchasers can solicit bids for an advertising campaign from a variety of advertisement publishers in a reverse auction format, with predictable quality and a predictable audience composition.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
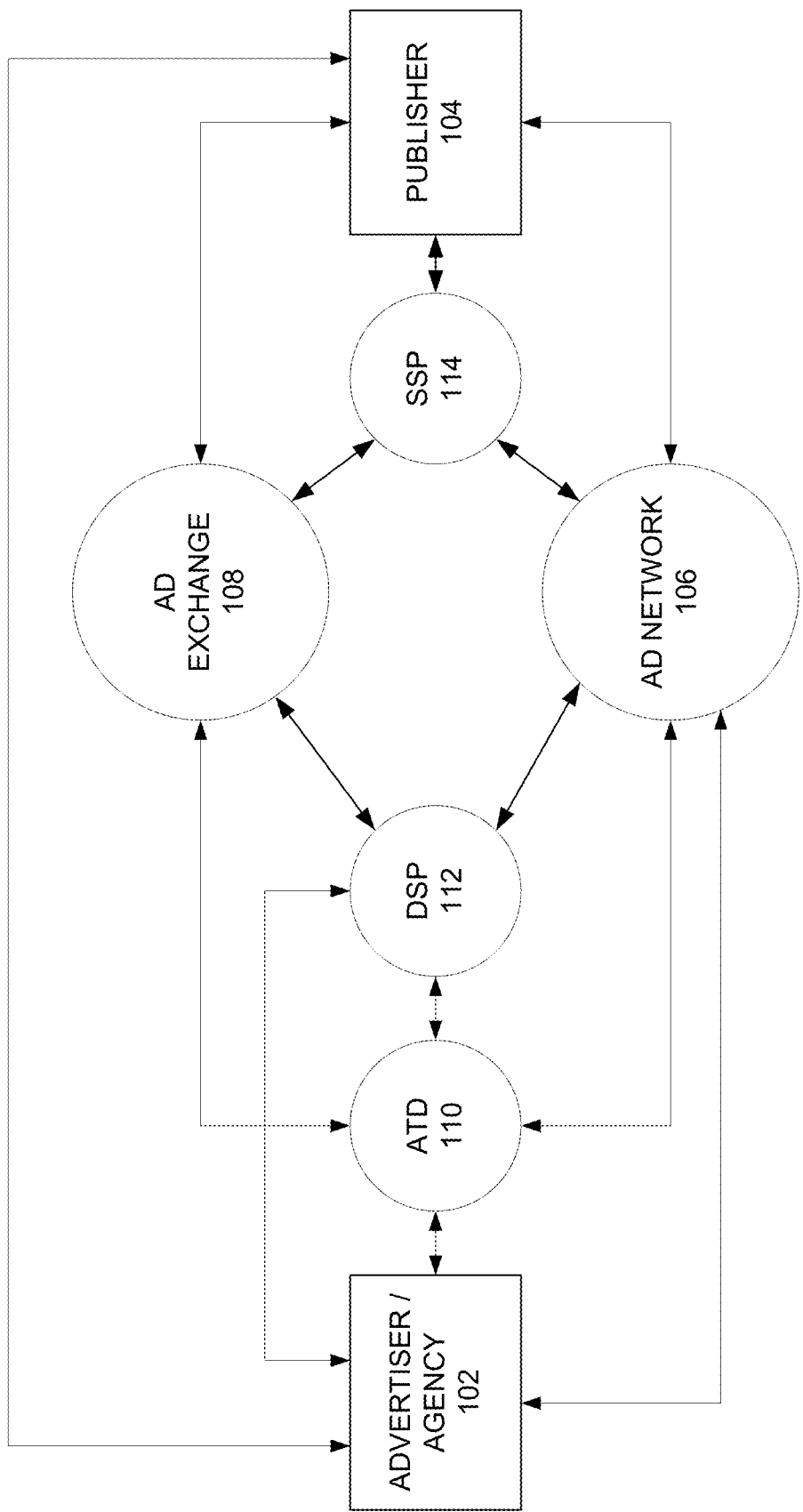
FIG. 1 illustrates an advertising ecosystem of the prior art.
Figure 2:
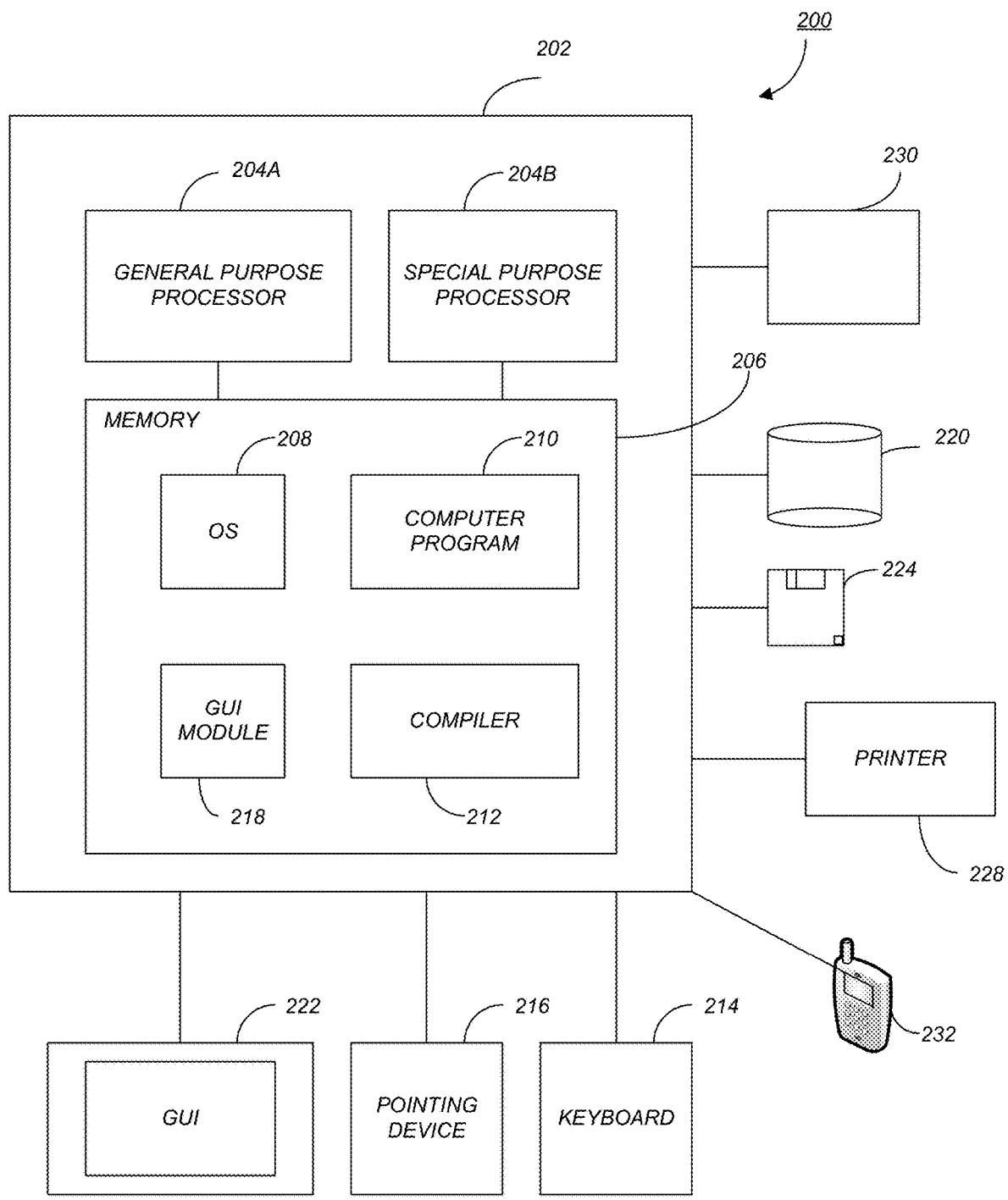
FIG. 2 is an exemplary hardware and software environment used to implement one or more embodiments of the invention.

FIG. 2 is an exemplary hardware and software environment 200 used to implement one or more embodiments of the invention. The hardware and software environment includes a computer 202 and may include peripherals. Computer 202 may be a user/client computer, server computer, or may be a database computer. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to, and/or integrated with, other devices, including input/output (I/O) devices such as a keyboard 214, a cursor control device 216 (e.g., a mouse, a pointing device, pen and tablet, touch screen, multi-touch device, etc.) and a printer 228. In one or more embodiments, computer 202 may be coupled to, or may comprise, a portable or media viewing/listening device 232 (e.g., an MP3 player, iPod™, Nook™, portable digital video player, cellular device, personal digital assistant, etc.). In yet another embodiment, the computer 202 may comprise a multi-touch device, mobile phone, gaming system, internet enabled television, television set top box, or other internet enabled device executing on various platforms and operating systems.

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208, to provide output and results.

Output/results may be presented on the display 222 or provided to another device for presentation or further processing or action. In one embodiment, the display 222 comprises a liquid crystal display (LCD) having a plurality of separately addressable liquid crystals. Alternatively, the display 222 may comprise a light emitting diode (LED) display (and/or a LED-backlit LCD display) having clusters of red, green and blue diodes driven together to form full-color pixels. Each liquid crystal or pixel of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218. Although the GUI module 218 is depicted as a separate module, the instructions performing the GUI functions can be resident or distributed in the operating system 208, the computer program 210, or implemented with special purpose memory and processors.

In one or more embodiments, the display 222 is integrated with/into the computer 202 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 202 according to the computer program 210 instructions may be implemented in a special purpose processor 204B. In this embodiment, the some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program 210 instructions. In one embodiment, the special purpose processor 204B is an application specific integrated circuit (ASIC).

The computer 202 may also implement a compiler 212 that allows an application or computer program 210 written in a programming language such as COBOL (Common Business-Oriented Language), Pascal, C++, FORTRAN, or other language to be translated into processor 204 readable code. Alternatively, the compiler 212 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 210 accesses and manipulates data accepted from I/O devices and stored in the memory 206 of the computer 202 using the relationships and logic that were generated using the compiler 212.

The computer 202 also optionally comprises an external communication device such as a modem, satellite link, Ethernet card, or other device for accepting input from, and providing output to, other computers 202.

In one embodiment, instructions implementing the operating system 208, the computer program 210, and the compiler 212 are tangibly embodied in a non-transient computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program 210 instructions which, when accessed, read and executed by the computer 202, cause the computer 202 to perform the steps necessary to implement and/or use the present invention or to load the program of instructions into a memory 206, thus creating a special purpose data structure causing the computer 202 to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 202.

Figure 3:
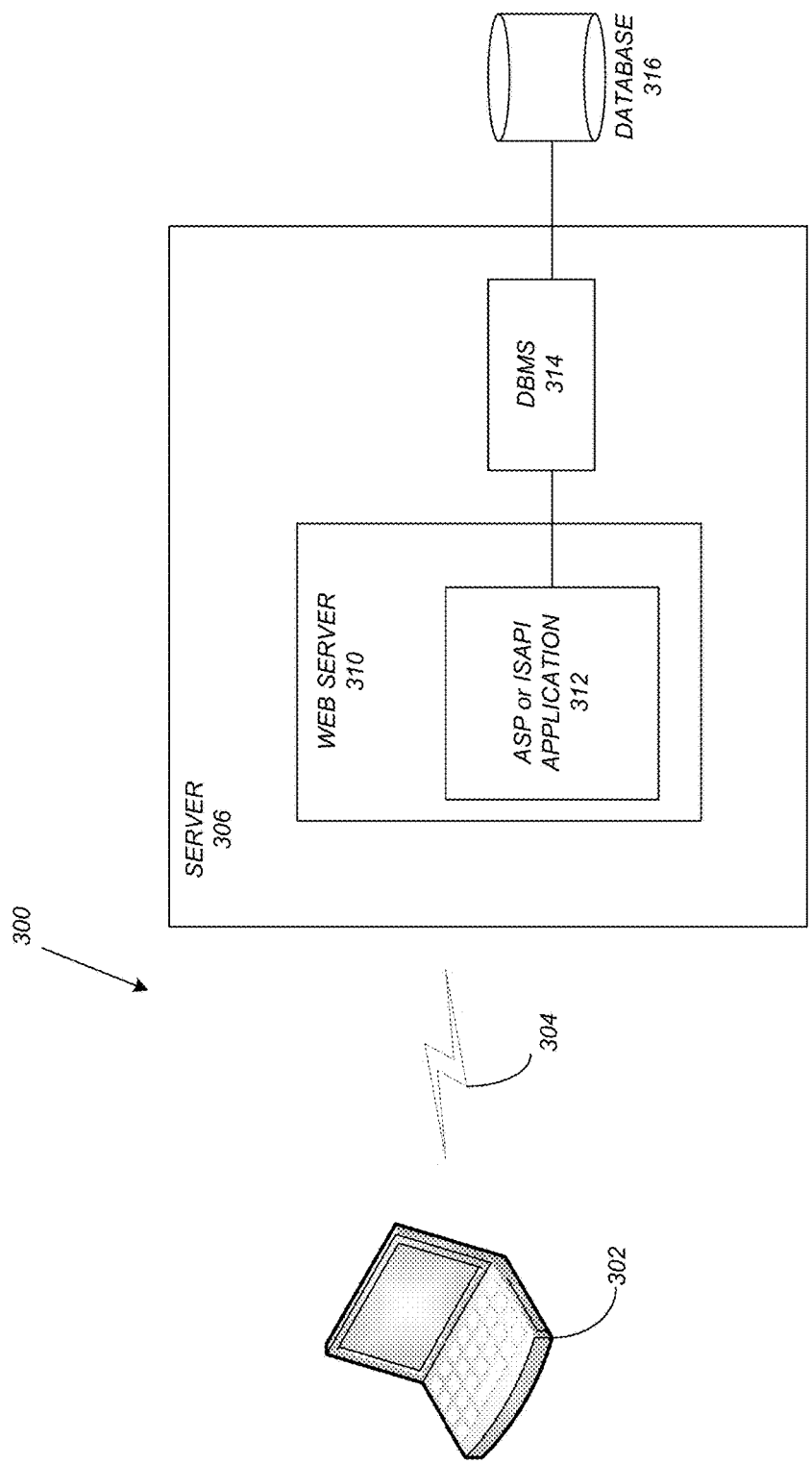
FIG. 3 schematically illustrates a typical distributed computer system using a network to connect client computers to server computers in accordance with one or more embodiments of the invention.

FIG. 3 schematically illustrates a typical distributed computer system 300 using a network 304 to connect client computers 302 to server computers 306. A typical combination of resources may include a network 304 comprising the Internet, LANs (local area networks), WANs (wide area networks), SNA (systems network architecture) networks, or the like, clients 302 that are personal computers or workstations (as set forth in FIG. 2), and servers 306 that are personal computers, workstations, minicomputers, or mainframes (as set forth in FIG. 2). However, it may be noted that different networks such as a cellular network (e.g., GSM [global system for mobile communications] or otherwise), a satellite based network, or any other type of network may be used to connect clients 302 and servers 306 in accordance with embodiments of the invention.

A network 304 such as the Internet connects clients 302 to server computers 306. Network 304 may utilize ethernet, coaxial cable, wireless communications, radio frequency (RF), etc. to connect and provide the communication between clients 302 and servers 306. Clients 302 may execute a client application or web browser and communicate with server computers 306 executing web servers 310. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 302 may be downloaded from server computer 306 to client computers 302 and installed as a plug-in or ACTIVEX™ control of a web browser. Accordingly, clients 302 may utilize ACTIVEX™ components/component object model (COM) or distributed COM (DCOM) components to provide a user interface on a display of client 302. The web server 310 is typically a program such as MICROSOFT'S INTERNET INFORMATION SERVER™.

Web server 310 may host an Active Server Page (ASP) or Internet Server Application Programming Interface (ISAPI) application 312, which may be executing scripts. The scripts invoke objects that execute business logic (referred to as business objects). The business objects then manipulate data in database 316 through a database management system (DBMS) 314. Alternatively, database 316 may be part of, or connected directly to, client 302 instead of communicating/obtaining the information from database 316 across network 304. When a developer encapsulates the business functionality into objects, the system may be referred to as a component object model (COM) system. Accordingly, the scripts executing on web server 310 (and/or application 312) invoke COM objects that implement the business logic. Further, server 306 may utilize MICROSOFT'S™ Transaction Server (MTS) to access required data stored in database 316 via an interface such as ADO (Active Data Objects), OLE DB (Object Linking and Embedding DataBase), or ODBC (Open DataBase Connectivity).

Generally, these components 300-316 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 302 and 306 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 302 and 306.

Software Embodiment Overview

Embodiments of the invention are implemented as a software application on a client 302 or server computer 306. Further, as described above, the client 302 or server computer 306 may comprise a thin client device or a portable device that has a multi-touch-based display.

As described above and in the related applications, advertisements may be purchased from publishers 404 based on quality/grade. However, the bidding is often a "spot" market where advertisers 402 purchase one spot (e.g., advertisement impression) at a time and there is no mechanism that guarantees that the advertiser 402 will acquire enough impressions to satisfy their business needs over a given time period (e.g., over the next quarter). Consequently, there is no way for an advertisement purchaser 402 to determine what price they will have to pay for one or more impressions resulting in problems with respect to budgeting and business projections. Embodiments of the invention attempt to overcome such problems.

Figure 4:
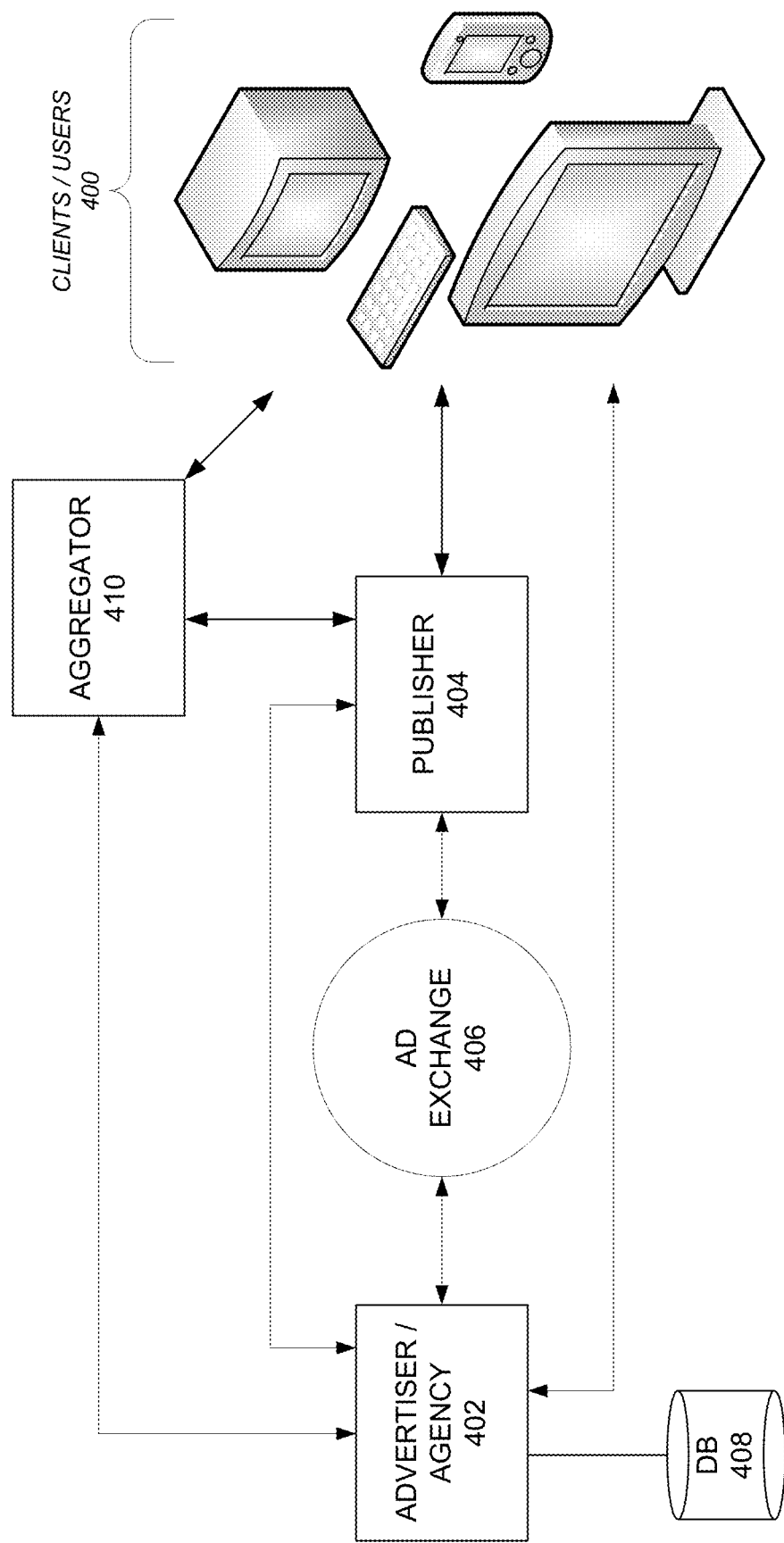
FIG. 4 illustrates an advertising ecosystem that may be utilized in accordance with one or more embodiments of the invention.

FIG. 4 illustrates an advertising ecosystem that may be utilized in accordance with one or more embodiments of the invention. The components of FIG. 4 (i.e., clients/users 400, advertiser/agency 402, publisher 404, and/or ad exchange 406) may be implemented on one or more clients 302 and or servers 306.

As used herein, the term "Publishers" 404 refers to entities that have advertisement impressions that are available for purchase (e.g., websites, media content to be delivered [e.g., videos, audio, etc.], etc.). Once purchased by advertiser/agency 404, advertisements may be delivered directly by the advertiser/agency 402 to the client/user 400 and/or may be provided as part of the content delivered by the publisher 404 to the client/user 400.

Embodiments of the invention provide an advertisement exchange 406 that provides the ability for an advertisement purchaser 402 to acquire an "upfront"—i.e., the ability for the advertisement purchaser 402 to solicit bids from publishers 404 to fulfill a desired ad campaign. Accordingly, an advertisement purchaser 402 specifies parameters for a request for advertisement campaign bids. Such parameters may include a designated group of users 400 or criteria (e.g., demographics) for a group of users 400, an optional indication of how much the purchaser 402 is willing to pay (e.g., a minimum/maximum), the number of impressions, a certain maximum frequency per user, and/or a certain quality of inventory, a bid ending date/time. As an example, the advertisement purchaser 402 may propose a quarterly bid process where two weeks before the start of a quarter, all of the campaigns/request from publishers 404 need to be submitted.

Advertisers 402 may also have the option of soliciting or specifying particular criteria for which publishers 404 may be permitted to view and/or submit proposed bids in response to the request. Further, the exchange 406 may automatically forward the request for bids to the specified publishers 404 and/or the publishers 404 that satisfy the bidding criteria.

To enable the upfront capabilities, embodiments of the invention provide a self-service user interface (UI) that is used in combination with the bidding ecosystem described above (e.g., a second price auction). Such a UI may be provided to advertisement purchasers (e.g., ad agencies) 402 as part of a technology platform exchange 408 for managing advertisement campaigns/bidding.

Further to the above, publishers 404 may place pixels in their advertisements that enable the collection of statistics on the publisher's users 400 and advertisement inventory. As used herein, such a "pixel" refers to a system-to-system message (not necessarily a screen pixel). Pixels are used for all types of measurement and validation services. Embodiments of the invention provide a user ID (identification) in a pixel. Accordingly, a publisher 404 fires a pixel in an advertisement that records the user 400 that receives the impression. The advertiser 402 receives the pixel and can map the information in the pixel to data maintained by the advertiser 402. For example, user profiles may be maintained in an advertiser's database 408. The database 408 may also record who the user 400 is, which site/publisher/network 404 the user was on, the quality of advertisement inventory that the user 400 customarily receives, etc.

Publishers 404 may view the details of the bid. Further, based on the pixels fired by the publishers 404, the publishers 404 have the ability to determine how much of the ad campaign they can fulfill. For example, publisher A may know that based on the users 400 being targeted, they will be able to fulfill 50% of the campaign (e.g., 10 million users or 50 million impressions). When submitting a bid, the publisher 404 can specify the price they are willing to sell the advertisement impressions for. Publisher bidders 404 may also have the ability to specify that their bid is valid only if a certain guaranteed minimum (e.g., in terms of number of impressions or money) is awarded by the advertiser 402.

An additional feature of embodiments of the invention may include an aggregator entity 410 (e.g., a third party such as the assignee of the present application) that may also maintain the user 400 and publisher 404 related information while potentially recording the quality of the inventory that a particular impression represented so that such impressions can be grouped/aggregated into buckets. The impressions and users 400 in each bucket can then be counted for each publisher 404. The aggregated counts/information may be analyzed in order to extrapolate information. For example, from the aggregation of data, a system may be able to determine that over the last quarter, month, etc., a particular publisher 404 (e.g., MSN™) has a particular distribution of users 400 and a particular distribution of advertisement inventory quality.

User information may also be cookie synched (also known as user ID synched) such that varying entities exchange user IDs and map internal user IDs to user IDs of other parties. Such information allows the identification of a user 400 internally regardless of how that user is identified. For example, if a publisher 404 has their own advertisement server that stores user profiles for users 400, the publisher 404 may fire a pixel once per user 400 over a period of time and pass along the user ID in that pixel. The user ID may be placed into an internal database. Thereafter, whenever either entity (e.g., the advertiser 402 or publisher 404) is referring to a particular user ID, both parties 402 and 404 know which user 400 is being referred to without having to pass additional information each time (e.g., user demographic information).

Advertisers 402 may desire to target a specific group of users 400 based on their user IDs and other information. For example, if an advertiser 402 has a pool of a million user IDs that they feel are most interested in a new car, such advertisers 402 may specify the user IDs of the million users 400 for a targeted campaign that includes a specific number of advertisement impressions. By virtue of the pixels from each of the publishers 404, an advertising exchange 406 has the ability to determine which and how many of these users 400 each of the publishers 404 sees over a given period of time. Based thereon, an advertising exchange 406 can determine how many impressions each publisher 404 may be able to satisfy of a desired advertisement campaign.

As an example, if an advertiser 402 desires to target 1 million users 400 five (5) times each (e.g., for a total of 5 million impressions), the advertisement exchange 406 can determine which publisher 404 can fulfill the impressions. As a specific example, the advertisement exchange 406 may determine that MSN™ can fulfill ½ of the 5 million impressions because they have seen ⅔ of the identified users 400 on an average of three times; AOL™ can fulfill a different amount, and Yahoo™ can fulfill yet another amount.

With respect to bidding submissions, multiple bids may be submitted by multiple publishers 404 (e.g., by a specified deadline) and the advertisement purchaser 402 can then evaluate the bids (if desired) to select a winning bidder 404. Alternatively, in an online exchange 406, the winning bidder(s) may be automatically determined based on a specified set of rules/criteria. Such bid award criteria may include the lowest bid, impression quality/grade, etc. Further, the bid award criteria may utilize a complex methodology that ensures the maximum number of impressions are satisfied (e.g., by awarding different amounts to different publishers 404).

For example, once all bids have been submitted by a bid deadline of 1 week before the start of a quarter, the system may determine the following:

Publisher 1 (e.g., MSN™) gave the lowest bid for 5 million impressions and is awarded such impressions;

Publisher 2 (e.g., AOL™) gave the second highest bid, and although it could have fulfilled 10 million impressions, 2.5 million of the users overlap with Publisher 1 (MSN™), so Publisher 2 (AOL™) is awarded 7.5 million;

Publisher 3 (e.g., Yahoo™) bid the third lowest and could have fulfilled 10 million impressions but 5 million impressions overlap with Publisher 1 (MSN™) and Publisher 2 (AOL™) so Publisher 3 (Yahoo™) is awarded 5 million impressions;

leaving 5 million impressions that nobody can fulfill which may be offered on the spot market.

Alternatively, if one of the publishers 404 falls behind towards the end of a quarter, a mechanism may automatically punish that publisher 404 by taking away some of their commitment and reallocating those impressions to another party or offering them on the spot market.

Overview

In view of the above, embodiments of the invention enable an advertising purchaser 402 to specify advertising campaign parameters and request bids from publishers 404 desiring to fulfill the advertising campaign. Such embodiments may further provide the following:

Publishers 404 put pixels in their ads such that statistics may be gathered on their users 400 and ad inventory;

Periodically, advertisers 402 list (in an advertisement exchange 406) a campaign they desire to run, specifying the total reach and frequency desired, the maximum spend, as well as any other restrictions, and may include a list of user IDs they desire to target (which may be determined for them [based on data maintained by the exchange 406 or a third party 410] and their targeting goals e.g. Males 18-30);

Publishers 404 come into the exchange user interface on a given date, look at the campaigns, and respond with their price and commitment to deliver. The exchange 406 can tell the publishers 404, based on the publisher's pixels, how much the publisher 404 would have been able to deliver during the last period given all campaign constraints including the target audience, frequency, and required quality.

Exchange 406 awards buys to publishers 404 starting with the lowest price until the entire campaign has been allocated (and/or utilizing a methodology that ensures the maximum number of impressions of a desired quality are awarded for the lowest price or based on other criteria desired by the advertiser 402).

In view of the above, embodiments of the invention provide the ability to match desired users 400 with the inventory on the publishers 404. Embodiments of the invention also have the pixels, user data, and backend systems to measure overlap to further enhance the online exchange. In addition, embodiments of the invention provide quality verification and restriction on the buy.

Logical Flow

Figure 5:
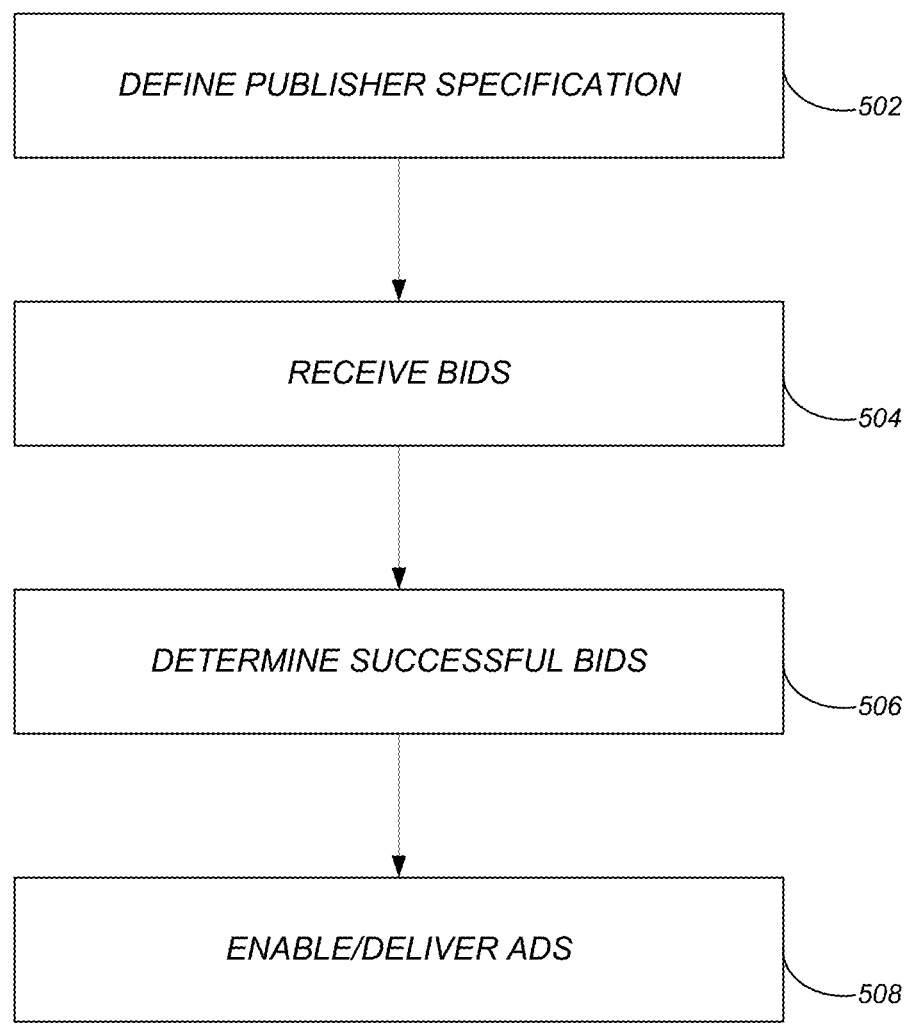
FIG. 5 illustrates the logical flow for bidding for an advertising impression in accordance with one or more embodiments of the invention.

FIG. 5 illustrates the logical flow for bidding for an advertising impression in accordance with one or more embodiments of the invention.

At step 502, via input from an advertising purchaser, a publisher specification/configuration is defined. The publisher specification includes the parameters/configurations for impression information regarding impressions desired by the advertising purchaser. An exemplary publisher specification may include a maximum price (e.g., that an advertising purchaser is willing to pay for an impression), a total number of impressions (that the advertising purchaser desires to purchase), and a maximum/minimum number of impressions per user (e.g., the frequency on which a user receives an impression from the advertising purchaser). The publisher specification may also include an identification of one or more specific users, types of users, and/or user demographics (e.g., that the advertiser desires to serve impressions to). Such a user list may be uploaded or the target users may be set/configured by the advertiser.

Further, the publisher specification may include an impression quality rank that is based on a measure of a probability of an actual advertising impression being seen and acted upon by an end consumer (e.g., an impression grade such as A, B, C, D, and/or F such as that offered by Adricity™—a product available from the assignee of the present invention).

At step 504, an advertising auction is conducted. The advertiser may solicit bids from one or more publishers (specifically targeted publishers [e.g., based on the publisher's users], or a general solicitation to a group of publishers, all publishers, etc.). Such a solicitation may provide/include the publisher specification or parameters regarding the type of publisher/end user that bids are being solicited from. In other words, the publisher specification/configuration data may be placed into a bid solicitation.

The publishers may have access to all of the publisher specifications and may utilize the publisher specification to evaluate whether and how much the publisher can deliver/fulfill. Thereafter, the publisher can submit a bid if desired. During the auction, bids are received from one or more publishers that comply with the publisher specification. Such an auction may be conducted by an advertising exchange application/server on behalf of advertising purchasers (e.g., advertisers). In one or more embodiments, the auction may be conducted at regularly defined time intervals (e.g., once per quarter, once per year, etc.).

At step 506, a determination is made regarding which of the bidding publishers has provided a successful bid. As an example, a successful bid may consist of the lowest price for an advertising impression on the publisher's website (e.g., consistent with the publisher's specification). Further, once the auction is complete (or during the auction process), a closing price (e.g., blended) of the auction may be displayed (e.g., for losing publishers to refine future bidding strategies).

At step 508, the advertising purchaser is enabled to provide advertisements to the successful bidding publishers. A publisher's pixel (e.g., that may include a user identification) may be inserted into the advertisement (e.g., by the publisher). As described above, statistics of users receiving the one or more advertisements may be collected (e.g., based on the publisher's pixel). The statistics may be analyzed to determine one or more user bases of the one or more publishers (e.g., the user demographics, identification of particular users, etc.).

Exemplary Bidding Process

Figure 6:
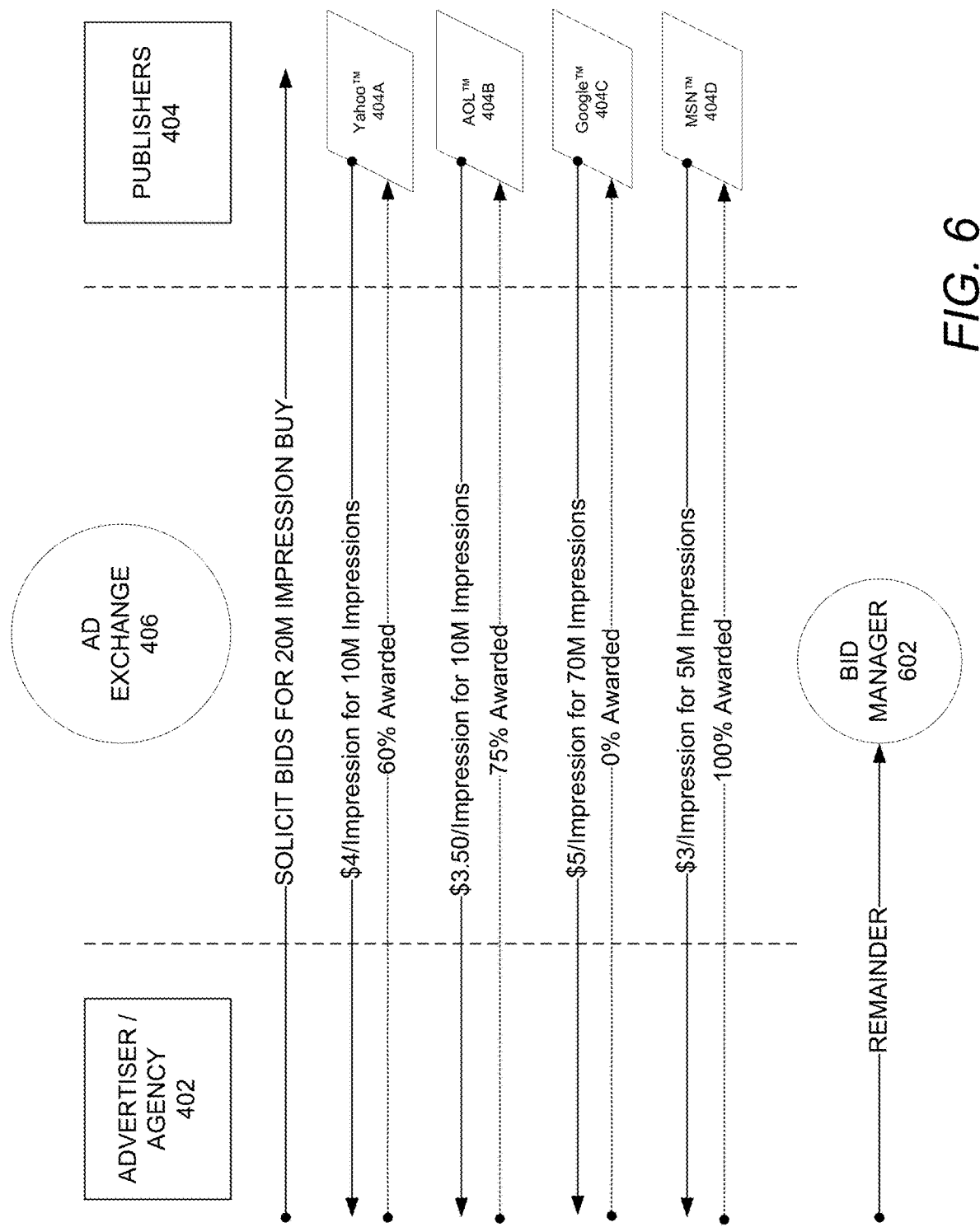
FIG. 6 illustrates a specific example of the bidding process that may be conducted in accordance with one or more embodiments of the invention.

FIG. 6 illustrates a specific example of the bidding process that may be conducted in accordance with one or more embodiments of the invention. The advertiser 402 has solicited bids for a 20 million impression buy from a variety of publishers 404. Four different publishers 404 have submitted and are awarded bids. Yahoo™ 404A has offered $4 per impression for 10 million impressions. AOL™ 404B has offered $3.50 per impression for 10 million impressions. Google™ 404C has offered $5 per impression for 70 million impressions, and MSN™ 404D has offered $3 per impression for 5 million impressions. Since MSN™ 404D bid the least, 100% of their campaign is awarded, while only 75% of AOL's 404B bid and 60% of Yahoo's 404A bid are accepted. Accordingly, approximately 75% of the total inventory has been fulfilled. Any remaining impressions that have not been satisfied may be managed by a bid manager 602 (e.g., on the spot market) and awarded to the maximum/minimum bidder.

Further, as described above, the publishers 404 may fire pixels so that the online exchange 406 can identify users (e.g., 1 pixel per user or per impression may be fired). Such pixel information may enable cookie synching (e.g., both ways). Based on such information, during the bidding process, the online exchange 406 may calculate the reach and frequency that the publisher 404 can fulfill (e.g., to enable the publisher 404 to submit a calculated bid). Thus, when the publisher 404 is submitting a bid, the online exchange 406 may indicate the past delivery percentage rating for each publisher 404 (e.g., 75% for Yahoo™, 100% for AOL™, and 90% for Google™). In addition, as described above, once a number of impressions have been awarded, if the publisher 404 falls behind in their delivery rate, impressions awarded may be removed and/or reallocated to other parties/publishers or be sold on the spot market.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for bidding for an advertising impression, comprising:

defining, via input from an advertising purchaser, a publisher specification, wherein the publisher specification comprises impression information regarding impressions desired by the advertising purchaser, wherein the impressions comprise individual instances when an online advertisement is shown to a particular user via an Internet network;

conducting an online based auction comprising a reverse auction by receiving, via the Internet network, one or more bids from one or more publishers, wherein the one or more bids comply with the publisher specification, and wherein the one or more publishers have impressions to sell to the advertising purchaser;

determining, in a processor in a computer, which of the one or more publishers has provided a successful bid;

enabling, via the processor in the computer, the advertising purchaser to provide, via the Internet network, one or more advertisements, for use in the impressions, to the one or more publishers that provided the successful bid;

the publisher that provided the successful bid inserting a publisher's pixel into the one or more advertisements, wherein the publisher's pixel comprises a user identification of the user that receives the one or more advertisements;

the advertising purchaser receiving the publisher's pixel and collecting statistics of the users receiving the one or more advertisements based on the publisher's pixel;

determining, based on the publisher's pixel, during the online based auction, a reach and frequency that the publisher, that provided the successful bid, can fulfill;

analyzing the statistics and determining one or more user bases of the one or more publishers; and utilizing the statistics and the one or more user bases in a subsequent bidding process.

2. The computer-implemented method of claim 1, wherein the publisher specification comprises:
a maximum price;
a total number of impressions; and
an impression per user frequency.

3. The computer-implemented method of claim 1, wherein the publisher specification comprises:
an identification of one or more users.

4. The computer-implemented method of claim 1, wherein the publisher specification comprises:
an identification of a user demographic.

5. The computer-implemented method of claim 1, wherein the publisher specification comprises:
an impression quality rank that is based on a measure of a probability of an actual advertising impression being seen and acted upon by an end consumer.

6. The computer-implemented method of claim 1, further comprising:
soliciting the one or more bids, from the one or more publishers, based on the publisher specification.

7. The computer-implemented method of claim 1, further comprising:
displaying a closing price of the auction.

8. The computer-implemented method of claim 1, wherein the auction is conducted at regularly defined time intervals.

9. An advertising exchange system for bidding for an advertising impression in computer system comprising:
(a) a server computer having a processor and memory;
(b) an advertising exchange application executed by the processor on the server computer, wherein the advertising exchange application is configured to:
(1) define, via input from an advertising purchaser, a publisher specification, wherein the publisher specification comprises impression information regarding impressions desired by the advertising purchaser, wherein the impressions comprise individual instances when an online advertisement is shown to a particular user via an Internet network;
(2) conduct an online based auction comprising a reverse auction, by receiving, via the Internet network, one or more bids from one or more publishers, wherein the one or more bids comply with the publisher specification, and wherein the one or more publishers have impressions to sell to the advertising purchaser;
(3) determine which of the one or more publishers has provided a successful bid;
(4) enable the advertising purchaser to provide, via the Internet network, one or more advertisements, for use in the impressions, to the one or more publishers that provided the successful bid;
(5) insert, via the publisher that provided the successful bid, a publisher's pixel into the one or more advertisements, wherein the publisher's pixel comprises a user identification of the user that receives the one or more advertisements;
(6) collect, at the advertising purchaser, statistics of the users receiving the one or more advertisements based on the publisher's pixel;
(7) determine, based on the publisher's pixel, during the online based auction, a reach and frequency that the publisher, that provided the successful bid, can fulfill;
(8) analyze the statistics and determine one or more user bases of the one or more publishers; and
(9) utilize the statistics and the one or more user bases in a subsequent bidding process.

10. The advertising exchange system of claim 9, wherein the publisher specification comprises:
a maximum price;
a total number of impressions; and
an impression per user frequency.

11. The advertising exchange system of claim 9, wherein the publisher specification comprises:
an identification of one or more users.

12. The advertising exchange system of claim 9, wherein the publisher specification comprises:
an identification of a user demographic.

13. The advertising exchange system of claim 9, wherein the publisher specification comprises:
an impression quality rank that is based on a measure of a probability of an actual advertising impression being seen and acted upon by an end consumer.

14. The advertising exchange system of claim 9, wherein the advertising exchange application is further configured to:
solicit the one or more bids, from the one or more publishers, based on the publisher specification.

15. The advertising exchange system of claim 9, wherein the advertising exchange application is further configured to:
displaying a closing price of the auction.

16. The advertising exchange system of claim 9, wherein the auction is conducted at regularly defined time intervals.

* * * * *